US012803077B2

(12) United States Patent
Hu et al.

(10) Patent No.: US 12,803,077 B2
(45) Date of Patent: Nov. 17, 2026

(54) AIRCRAFT POWER BATTERY, AIRCRAFT, AND AIRCRAFT POWER BATTERY INTEGRATED POWER SUPPLY METHOD

(71) Applicant: EHANG INTELLIGENT EQUIPMENT (GUANGZHOU) CO., LTD., Guangzhou (CN)

(72) Inventors: Huazhi Hu, Guangzhou (CN); Shangzong Yang, Guangzhou (CN); Longhui Deng, Guangzhou (CN)

(73) Assignee: EHANG INTELLIGENT EQUIPMENT (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 19/026,482

(22) Filed: Jan. 17, 2025

(65) Prior Publication Data

US 2025/0174755 A1 May 29, 2025

Related U.S. Application Data

(63) Continuation of application No. PCT/CN2023/104886, filed on Jun. 30, 2023.

(30) Foreign Application Priority Data

Jul. 27, 2022 (CN) ........................ 202210892301.4

(51) Int. Cl.
*H01M 10/6554* (2014.01)
*B64D 27/357* (2024.01)
(Continued)

(52) U.S. Cl.
CPC ...... *H01M 10/6554* (2015.04); *B64D 27/357* (2024.01); *H01M 10/425* (2013.01);
(Continued)

(58) Field of Classification Search
CPC .......... H01M 10/6554; H01M 10/613; H01M 10/615; H01M 10/6568; H01M 50/249;
(Continued)

(56) References Cited

U.S. PATENT DOCUMENTS

| | | | |
|---|---|---|---|
| 2018/0086472 A1 | 3/2018 | Gore | |
| 2021/0184290 A1 | 6/2021 | Sweet et al. | |

(Continued)

FOREIGN PATENT DOCUMENTS

| | | | |
|---|---|---|---|
| CA | 3156558 A1 * | 1/2022 | .......... H01M 10/058 |
| CN | 106712202 A | 5/2017 | |

(Continued)

*Primary Examiner* — Robert L Deberadinis
(74) *Attorney, Agent, or Firm* — Bayramoglu Law Offices LLC

(57) ABSTRACT

An aircraft power battery, an aircraft, and an aircraft power battery integrated power supply method are provided. One battery box is accommodated in each separate compartment. The battery boxes in each row or column of separate compartments being connected in series and then being connected to a battery management system (BMS) module, forming a plurality of battery paths which are then connected in parallel, before supplying power to the aircraft. The method ensures power supply reliability and achieving the integrated arrangement of the limitation and integration of battery packs and battery management system, avoiding the occurrence of high working current and overheating of wire harness caused by scattered layout of each battery pack in the cabin, and is conducive to installation and maintenance. In addition, a cooling bottom plate is equipped for the power battery to ensure heat dissipation performance.

17 Claims, 8 Drawing Sheets

(51) Int. Cl.

| | |
|---|---|
| ***H01M 10/42*** | (2006.01) |
| ***H01M 10/613*** | (2014.01) |
| ***H01M 10/625*** | (2014.01) |
| ***H01M 10/6568*** | (2014.01) |
| ***H01M 50/204*** | (2021.01) |
| ***H01M 50/229*** | (2021.01) |
| ***H01M 50/249*** | (2021.01) |
| ***H01M 50/271*** | (2021.01) |
| ***H01M 50/289*** | (2021.01) |
| ***H01M 50/509*** | (2021.01) |

(52) U.S. Cl.
CPC ....... *H01M 10/613* (2015.04); *H01M 10/625* (2015.04); *H01M 10/6568* (2015.04); *H01M 50/204* (2021.01); *H01M 50/229* (2021.01); *H01M 50/249* (2021.01); *H01M 50/271* (2021.01); *H01M 50/289* (2021.01); *H01M 50/509* (2021.01); *H01M 2010/4271* (2013.01); *H01M 2220/20* (2013.01)

(58) Field of Classification Search
CPC ............. H01M 50/289; H01M 50/229; H01M 50/509; H01M 50/204; H01M 50/271; H01M 10/425; H01M 2010/4271; H01M 2220/20; H01M 10/42; B64D 27/357
See application file for complete search history.

(56) References Cited

U.S. PATENT DOCUMENTS

| | | | |
|---|---|---|---|
| 2022/0021068 | A1 | 1/2022 | Zeng et al. |
| 2022/0077520 | A1 | 3/2022 | Donovan |

FOREIGN PATENT DOCUMENTS

| | | | |
|---|---|---|---|
| CN | 107863471 | A | 3/2018 |
| CN | 113571821 | A | 10/2021 |
| CN | 114530648 | A | 5/2022 |
| CN | 216611605 | U | 5/2022 |
| CN | 115395131 | A | 11/2022 |
| CN | 218513525 | U | 2/2023 |
| TW | M457662 | U | 7/2013 |
| WO | 2020244588 | A1 | 12/2020 |

* cited by examiner

121

AIRCRAFT POWER BATTERY, AIRCRAFT, AND AIRCRAFT POWER BATTERY INTEGRATED POWER SUPPLY METHOD

CROSS REFERENCE TO THE RELATED APPLICATIONS

This application is a continuation application of International Application No. PCT/CN2023/104886, filed on Jun. 30, 2023, which is based upon and claims priority to Chinese Patent Application No. 202210892301.4, filed on Jul. 27, 2022, the entire contents of which are incorporated herein by reference.

TECHNICAL FIELD

The present invention relates to the technical field of unmanned aerial vehicles, particularly to an aircraft power battery, an aircraft, and an aircraft power battery integrated power supply method.

BACKGROUND

With the rapid development of technology, the new energy industry has received strong support from the government, and new energy technologies are becoming increasingly mature. Power batteries under new energy technologies have also been widely used in the field of unmanned aerial vehicles. The compact size of unmanned aerial vehicles limits their weight, and thus there is always a limit to the volume of the power battery. If the battery volume is increased, the energy consumption will correspondingly increase, and there will be inconvenient maintenance. In addition, the heat dissipation problem of the power battery cannot be ignored.

A power battery applied to unmanned aerial vehicles has been disclosed in the prior art, and the power battery includes a battery box, and a plurality of battery cells accommodated in the battery box. The power battery further includes a thermoelectric cooler, and a thermal conductive component. The battery cells are arranged to be stacked, and the thermal conductive component is attached between two adjacent battery cells. A first heat exchange surface of the thermoelectric cooler is attached to the same end wall of the thermal conductive component exposed to the battery cells, and a second heat exchange surface is configured to be able to exchange heat with an outside of the battery box. Through the arrangement of the thermal conductive component and the thermoelectric cooler, one thermoelectric cooler may be utilized to dissipate or heat multiple battery cells. However, such design requires both arrangements of thermal conductive components and thermoelectric coolers between the battery cells, and is relatively complex and is not conducive to installation and maintenance.

Moreover, currently, most passenger-carrying unmanned aerial vehicles use a low-voltage parallel connection solution for their power batteries, and even each battery pack is distributed in the cabin, and then fans are installed on the fixed brackets or housings of the battery packs for heat dissipation. It has the following defects: (1) the battery has a high working current, which makes the connected wire harness prone to overheating and has low power utilization rate; (2) the scattered arrangement of battery packs has inconvenient installation and maintenance due to the relatively sealed and narrow environment inside the cabin; (3) heat will be accumulated inside the cabin, affecting other components inside the cabin.

SUMMARY

To solve the problems of poor heat dissipation performance and inconvenient installation and maintenance of unmanned aerial vehicle power batteries, the present invention proposes an aircraft power battery, an aircraft, and an aircraft power battery integrated power supply method. The battery pack and battery management system are limited on their positions and integrated with integrated arrangement, and in combination with heat dissipation design, leading to convenient installation and maintenance, low complexity, and excellent heat dissipation performance.

In order to achieve the above technical effects, the technical solution of the present invention is as follows:

An aircraft power battery, which is provided at a bottom end of an aircraft and includes: a housing, an upper cover body, and a cooling bottom plate. N separate compartments arranged in rows and columns are provided inside the housing, and M battery management system (BMS) modules are further provided inside the housing. One battery box is accommodated in each separate compartment, and the upper cover body is located above the housing and the cooling bottom plate being located at a bottom end of the housing. The battery boxes in each row or each column of the separate compartments are connected in series and then are connected to one BMS module, such that M battery paths are formed. All battery paths are connected in parallel and currents are combined to supply power to the aircraft, wherein N is greater than M.

In this technical solution, N separate compartments arranged in rows and columns are provided in the housing; one battery box is accommodated in each separate compartment; the battery boxes in each row or each column of the separate compartments are connected in series and then are connected to one BMS module; a plurality of battery paths are formed and then connected in parallel, before supplying power to the aircraft. It achieves the integrated arrangement of the position limitation and integration of battery packs and battery management system, avoiding the occurrence of high working current and overheating of connected wire harness caused by scattered layout of each battery pack in the cabin, and is conducive to installation and maintenance. In addition, a cooling bottom plate is equipped to ensure heat dissipation performance.

Preferably, the housing includes a forward plate, a left plate, a backward plate, and a right plate; the forward plate, the left plate, the backward plate, and the right plate are sequentially combined and enclose to form an accommodating space; and the forward plate, the left plate, the backward plate, and the right plate are all made of composite materials; wherein outer layers of the forward plate, the left plate, the backward plate, and the right plate are all made of carbon fiber material, and inner layers of the forward plate, the left plate, the backward plate, and the right plate are all made of fiberglass material. It not only reduces the weight of the housing, but also leads to the insulation of the inner surface, improving power supply reliability.

Preferably, a battery cell body is provided in the battery box; an independent cover plate is provided on the battery cell body; a foam is provided on a side circumference of the battery cell body, and each separate compartment limits a position of the battery box via the foam.

Here, the battery box does not have an individual outer housing or fixed bracket, and relies on the foam and independent cover plates to achieve its own fixation and position limitation.

Preferably, a reinforcing bar is provided between adjacent rows or adjacent columns of separate compartments to enhance structural strength.

Preferably, one battery compartment is formed between each row or each column of the separate compartments and the reinforcing bar; each battery compartment corresponds to one battery path, and an explosion-proof valve is provided on each battery compartment.

Here, the battery paths in each battery compartment are relatively isolated and independent from the battery paths in other battery compartments. Therefore, an explosion-proof valve are provided on each battery compartment such that pressure relief may be performed for each battery compartment respectively, ensuring the independent, safe, and reliable working of each battery path.

Preferably, a current combiner box is further provided inside the housing; all battery paths are connected in parallel and then are connected to the current combiner box; the current combiner box is provided with several pairs of sockets and each pair of sockets corresponds to a positive interface and a negative interface respectively, for supplying power to different aircraft propeller motors.

Here, the different sockets provided may reduce the current passing through each socket and minimize heat generation.

Preferably, the upper cover body is constituted by two stamped and formed plates enclosed with each other; several cavities are formed between the plates, and a position of each cavity corresponds to a position of the battery box in the separate compartment below the cavity.

Here, the design of cavity for the upper cover body utilizes the poor thermal conductivity of air to effectively block heat from transferring upwards. The power battery is located at the bottom end of the aircraft to prevent heat from transferring into the cabin and from affecting other components inside the cabin.

Preferably, the plate of the upper cover body is made of composite material, where an outer layer of the upper cover body is made of carbon fiber material, and an inner layer of the upper cover body is made of glass fiber material. Carbon fiber plate and fiberglass plate are processed using lamination process to form composite materials, ensuring structural strength while reducing weight, leading to insulation of the inner surface of the box.

Preferably, the cooling bottom plate is provided with a water channel pipe arranged in manner of a flow channel along a surface of the cooling bottom plate; one end of the water channel pipe is provided with a liquid inlet; another end is provided with a liquid outlet, and an external cooling liquid is connected to the liquid inlet, achieving heat dissipation for the battery box.

The present application also proposes an aircraft. The aircraft is provided with the aircraft power battery; the aircraft power battery is provided at a bottom end of the aircraft, and the upper cover body of the aircraft power battery is in contact with the bottom end of the aircraft.

The present application also proposes an aircraft power battery integrated power supply method, and the method includes the following steps of:

S1. providing N separate compartments arranged in rows and columns inside a housing, and fixing a cooling bottom plate on a bottom of the housing;

S2. embedding a battery box into each of the N separate compartments and providing M battery management system (BMS) modules inside the housing;

S3. connecting the battery boxes in each row or column of the separate compartments in series, and then connecting the battery boxes connected in series in each row or column of the separate compartments to one BMS module to form one battery path;

S4. providing an upper cover body above the housing, connecting all battery paths in parallel and combining currents, and then the battery paths connected in parallel passing through the upper cover body to supply power to the aircraft.

Compared with the existing technology, the beneficial effects of the technical solution of the present invention are as follows:

The present invention proposes an aircraft power battery, an aircraft, and an aircraft power battery integrated power supply method. One battery box is accommodated in each separate compartment. The battery boxes in each row or each column of the separate compartments are connected in series and then are connected to one BMS module. A plurality of battery paths are formed and connected in parallel, before supplying power to the aircraft, ensuring power supply reliability and achieving the integrated arrangement of the position limitation and integration of battery packs and battery management system, avoiding the occurrence of high working current and overheating of connected wire harness caused by scattered layout of each battery pack in the cabin, and is conducive to installation and maintenance. In addition, a cooling bottom plate is equipped for the power battery to ensure heat dissipation performance.

Figure 1:
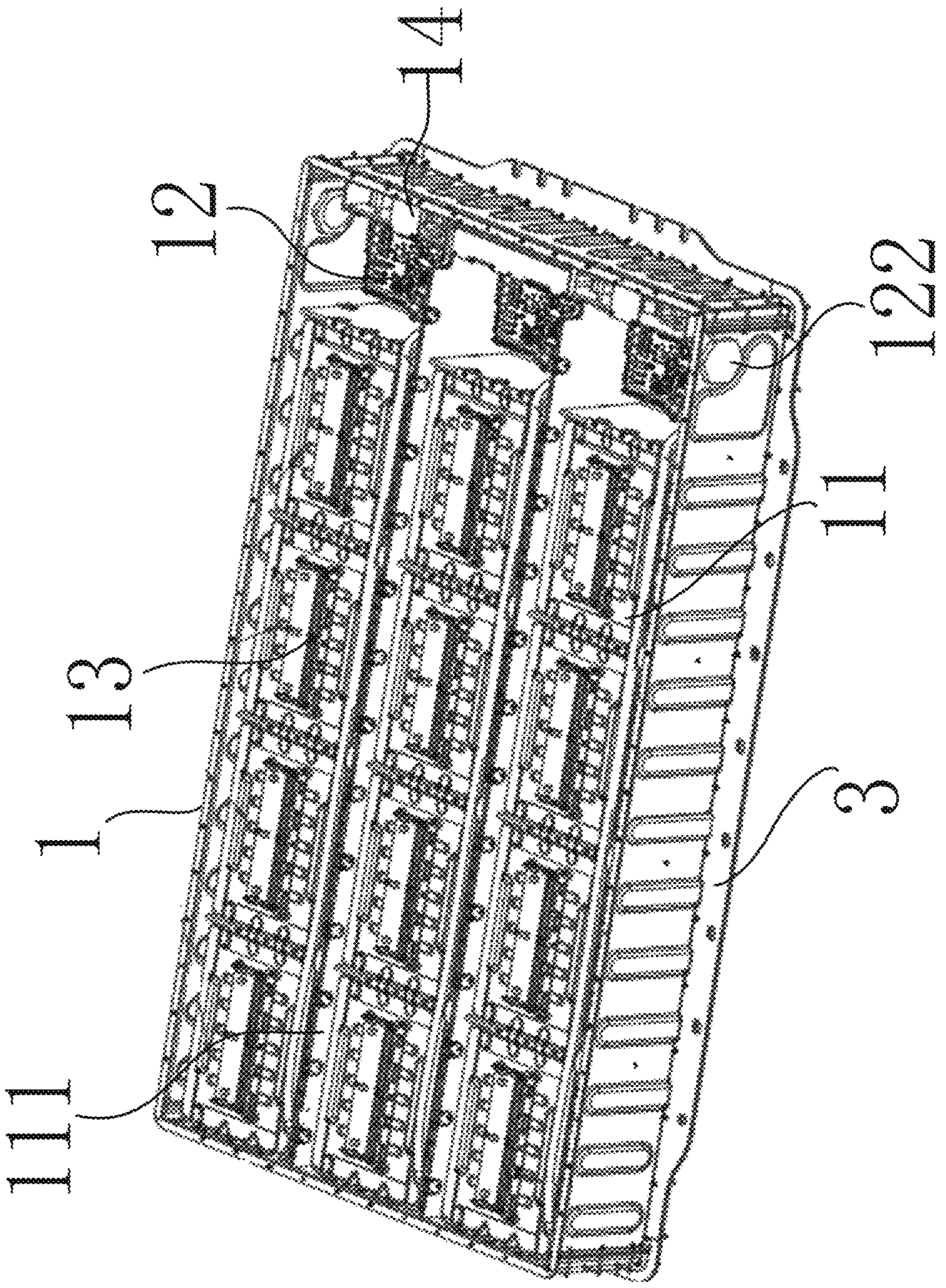
FIG. 1 shows a schematic diagram of the overall structure of a aircraft power battery proposed in Embodiment 1 of the present invention.

In the drawings: 1—housing; 2—upper cover body; 21—cavity; 3—cooling bottom plate; 11—separate compartment; 12—battery management system (BMS) module; 13—battery box; 121—foam; 111—reinforcing bar; 122—explosion-proof valve; 14—current combiner box; 131 socket; 31—water channel pipe; 311—liquid inlet; 312—liquid outlet.

DETAILED DESCRIPTION OF THE EMBODIMENTS

The accompanying drawings are for illustrative purposes only and should not be construed as limiting the scope of this patent;

In order to better illustrate the present embodiments, some components in the accompanying drawings may be omitted, zoomed in or zoomed out, and do not represent the actual size.

For those of ordinary skill in the art, it is understandable that description for some well-known content in the accompanying drawings may be omitted.

The technical solution of the present invention will be further explained in conjunction with the accompanying drawings and embodiments.

The description of the positional relationship in the accompanying drawings is for illustrative purposes only and should not be construed as a limitation on this patent.

Embodiment 1

Figure 2:
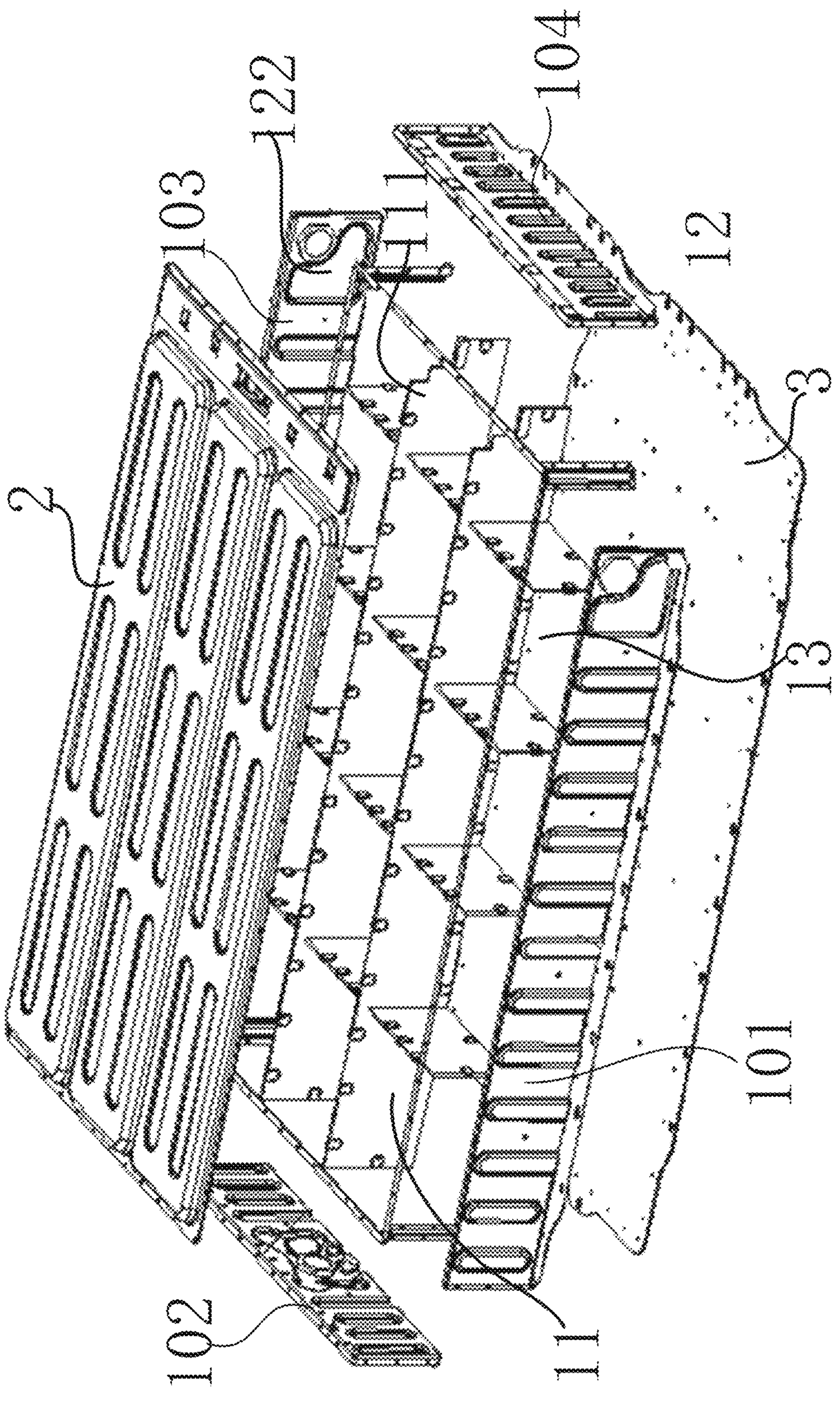
FIG. 2 shows a schematic diagram of the exploded structure of the overall components of the aircraft power battery proposed in Embodiment 1 of the present invention.

The present embodiment proposes an aircraft power battery. The aircraft power battery is provided at a bottom end of the aircraft in practical applications. FIG. 1 shows a schematic diagram of the overall structure of the aircraft power battery, and FIG. 2 shows an exploded structural diagram of the overall components of the aircraft power battery. In combination with FIG. 1 and FIG. 2, it can be seen that the aircraft power battery includes a housing 1, an upper cover body 2, and a cooling bottom plate 3. N separate compartments 11 arranged in rows and columns are provided in the housing 1, and M battery management system (BMS) modules 12 are further provided in the housing 1. The battery boxes 13 in each row of separate compartments 11 are connected in series and then are connected to one BMS module 12 (in other embodiments, the battery boxes 13 in each column of separate compartments 11 may be connected in series and then be connected to one BMS module 12 instead), such that M battery paths are formed, where N is greater than M, N is an integer and N is greater than or equal to 2, M is an integer and M is greater than or equal to 1. In another embodiment, N=2, M=1. And in other embodiments, N and M may be other suitable values. In present embodiment, referring to FIG. 1, there are 12 battery boxes 13 and 3 BMS modules 12 inside the housing 1, and each separate compartment 11 accommodates one battery box 13. The upper cover body 2 is located above the housing 1 and the cooling bottom plate 3 is located at a bottom end of the housing 1. The battery boxes 13 in each row of the separate compartments 11 are connected in series and then are connected to one BMS module 12, forming 3 battery paths, i.e., each row of 4 battery boxes 13 are connected in series and equipped with one BMS module 12 to form one battery path and 3 battery paths are formed in total. These 3 battery paths are relatively isolated in terms of structure, and all battery paths are connected in parallel and currents are combined to supply power to the aircraft. That is, the "four series and three parallel" battery box arrangement is achieved inside the housing 1, and each battery series path works independently with structural isolation.

Separate compartments 11 arranged in rows and columns are provided in the housing 1. One battery box is accommodated in each separate compartment 11. As shown in FIG. 1, the battery boxes 13 in each row of the separate compartments are connected in series and then are connected to one BMS module 2. A plurality of battery paths are formed and then connected in parallel, and then supply power to the aircraft. It achieves the integrated arrangement of the position limitation and integration of the battery packs and the battery management system, avoiding the occurrence of high working current and overheating of connected wire harness caused by scattered layout of each battery pack in the cabin currently, and is conducive to installation and maintenance. In addition, a cooling bottom plate 3 is provided to ensure heat dissipation performance.

As shown in FIG. 2, the housing 1 includes a forward plate 101, a left plate 102, a backward plate 103, and a right plate 104. The forward plate 101, the left plate 102, the backward plate 103, and the right plate 104 are sequentially combined and enclose to form an accommodating space. The forward plate 101, the left plate 102, the backward plate 103, and the right plate 104 are all made of composite materials, where outer layers of the forward plate 101, the left plate 102, the backward plate 103, and the right plate 104 are all made of carbon fiber material, and inner layers of the forward plate 101, left plate 102, the backward plate 103, and the right plate 104 are all made of fiberglass material. Carbon fiber plate and fiberglass plate are processed using lamination process to form the composite materials, which reduces weight and also leads to insulation of the inner surface of the housing. In the specific design, each outer plate is fixed by a combination of high-strength structural adhesive and aviation specific pop rivets. A sealing ring is provided on a contact surface where the housing 1 is closed by the upper cover body 2, and with the cooperation of the sealing ring, the overall protection level of the power battery assembly can reach IP67, improving the reliability of power supply.

Referring to FIG. 1 and FIG. 2, in the present embodiment, there are a total of 3 rows of separate compartments 11, and reinforcing bars 111 are provided between adjacent rows of separate compartments 11 to enhance the structural strength of the power battery. Each row of separate compartments 11 and reinforcing bars 111 form one battery compartment, and one battery compartment corresponds to one battery path. An explosion-proof valve 122 is provided on each battery compartment. Referring to FIG. 1, each battery path corresponds to one pack of battery boxes in series. The packs of battery boxes in series includes: a first pack of battery boxes in series, a second pack of battery boxes in series, and a third pack of battery boxes in series. The first pack of battery boxes in series, the second pack of battery boxes in series, and the third pack of battery boxes in series are arranged in different rows of separate compartments 11 in sequence. The explosion-proof valves 122 of the first pack of battery boxes in series and the third pack of battery boxes in series are located in a cubicle of the BMS module of the battery management system in the battery compartments. The explosion-proof valve 122 of the second pack of battery boxes in series is located at an end of a battery cubicle in the battery compartment. It can be seen that the battery paths in each battery compartment are relatively isolated and independent from the battery paths in other battery compartments. Therefore, the explosion-proof valve 122 are provided on each battery compartment such that pressure relief may be performed for each battery compartment respectively, ensuring the independent, safe, and reliable working of each battery path.

Figure 3:
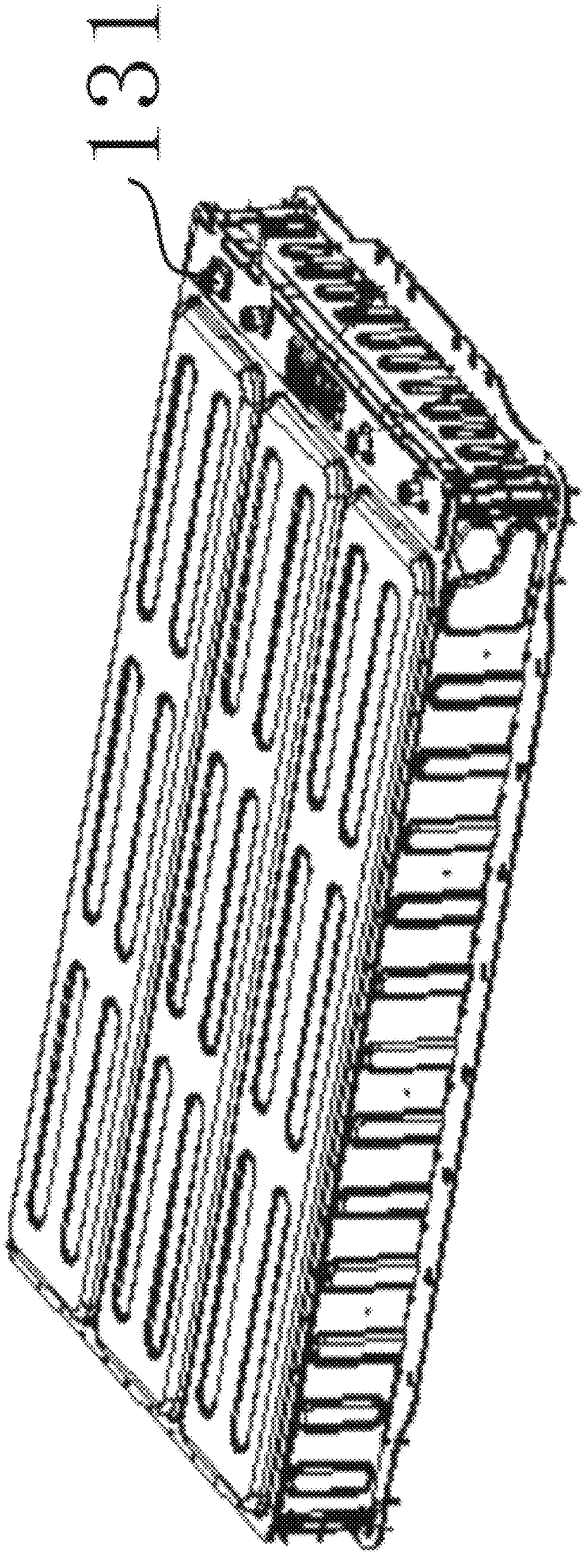
FIG. 3 shows another schematic diagram of the overall structure of the aircraft power battery proposed in Embodiment 1 of the present invention.

Referring to FIG. 1, a current combiner box 14 is further provided inside the housing 1, and all battery paths are connected in parallel and then connected to the current combiner box 14. Combined with the structural diagram in FIG. 3 showing that the upper cover body 2 has been closed, it can be seen that several pairs of sockets 131 are provided on the current combiner box 14. In the present embodiment, there are two pairs of sockets, i.e., four sockets, and each pair of sockets 131 corresponds to the positive and negative interfaces, respectively, for supplying power to different aircraft propeller motors. This design of providing different sockets may reduce the current passing through each socket and reduce heat generation.

Embodiment 2

Figure 4:
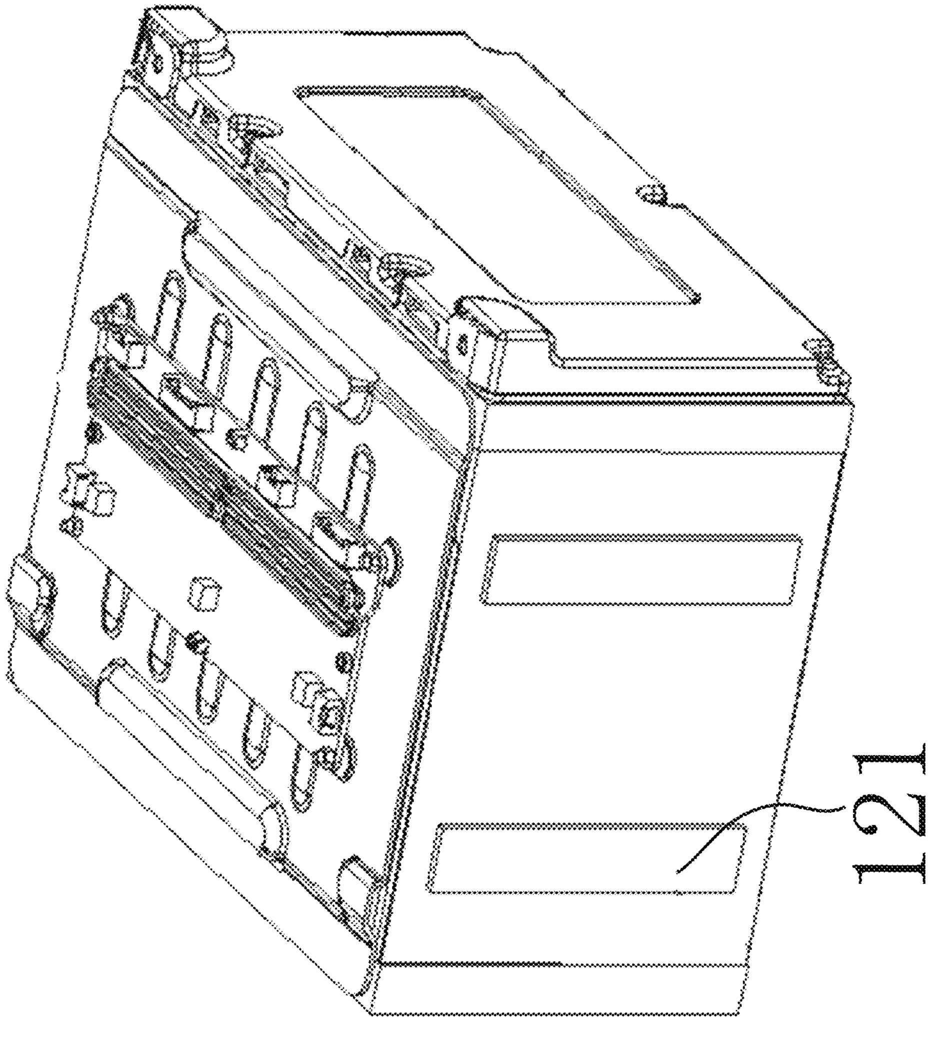
FIG. 4 shows the structural diagram of a battery box proposed in Embodiment 2 of the present invention.

Referring to the structural diagram of the battery box shown in FIG. 4, a battery cell body is provided in the battery box 13. An independent cover plate is provided on the battery cell body. Battery box is integrally designed. A foam 121 is provided on a side circumference of the battery cell body. Each separate compartment 11 limits the battery box via the foam 121 when designing the power battery. The battery box 13 does not have an individual outer housing or fixed bracket, and relies on the foam 121 and independent cover plates to achieve its own fixation and position limitation.

Embodiment 3

Figure 5:
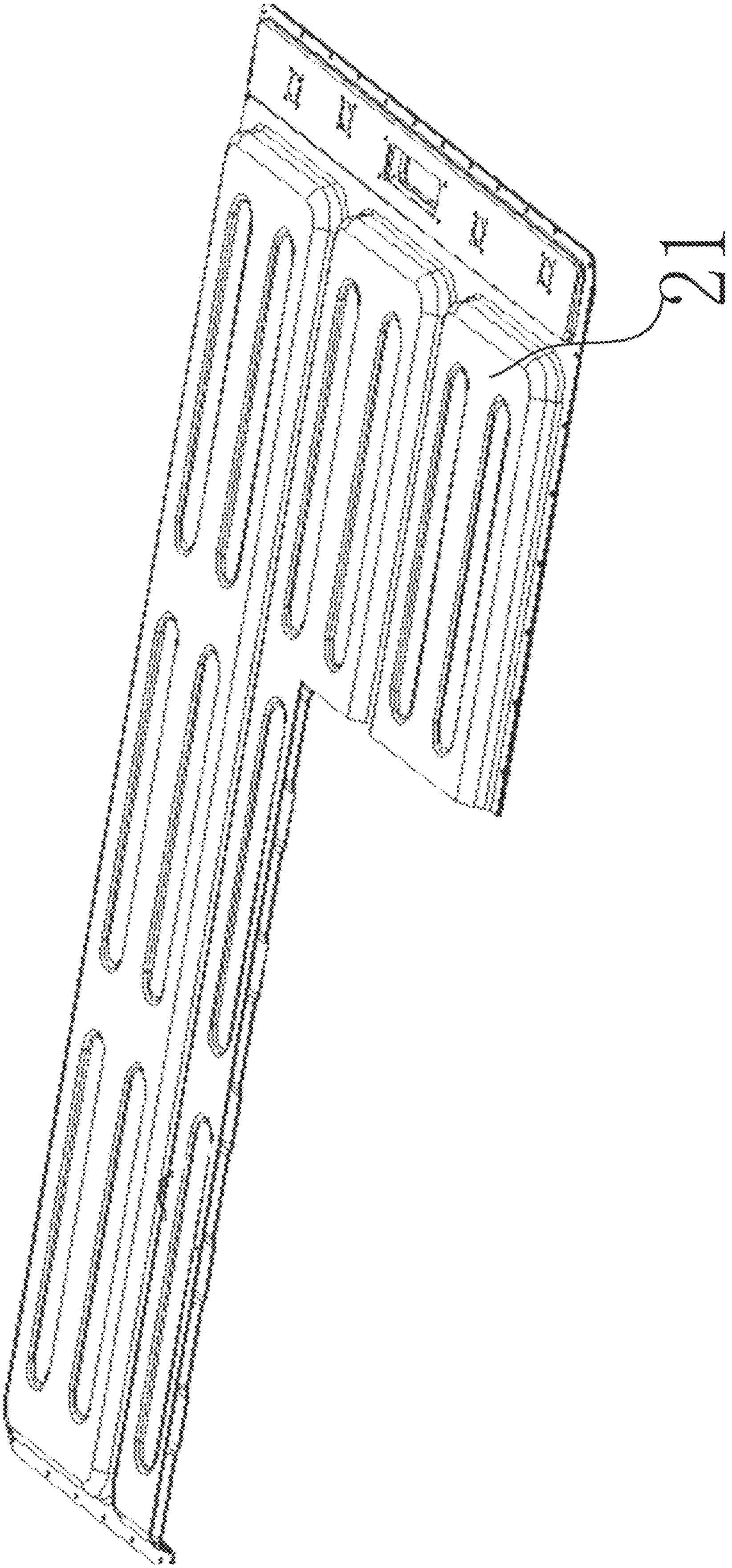
FIG. 5 shows a schematic diagram of the structure of an upper cover body proposed in Embodiment 3 of the present invention.

Referring to FIG. 5, the upper cover body 2 is constituted by two stamped and formed plates enclosed with each other. Several cavities 21 are formed between the plates. A position of each cavity 21 corresponds to a position of the battery box 13 in the separate compartment 11 below the cavity. The design of cavity for the upper cover body utilizes the poor thermal conductivity of air to effectively block heat from transferring upwards. The power battery is provided at the bottom of the aircraft to avoid heat from transferring into the cabin and from affecting other components inside the cabin.

In the present embodiment, as shown in FIG. 5, the upper cover body 2 has three cavities 21 independent to each other, and each cavity corresponding to one battery box 13 below (which can be illustrated in conjunction with FIGS. 2-3). In practical implementation, a plurality of connection holes are provided between each two adjacent cavities, which can be connected to the partition between adjacent separate compartments 11, thereby achieving a tight connection between the upper cover body 2 and the housing 1. In addition, in practical implementation, various forms of reinforcing bars are provided on the plate of the upper cover body 2 to prevent deformation of the plate under pressure.

The plate of the upper cover body 2 is made of composite material, where an outer layer of the upper cover body is made of carbon fiber material, and an inner layer of the upper cover body is made of glass fiber material. Carbon fiber plate and fiberglass plate are processed using lamination process to form composite materials, ensuring structural strength while reducing weight, leading to insulation of the inner surface of the housing.

Figure 6:
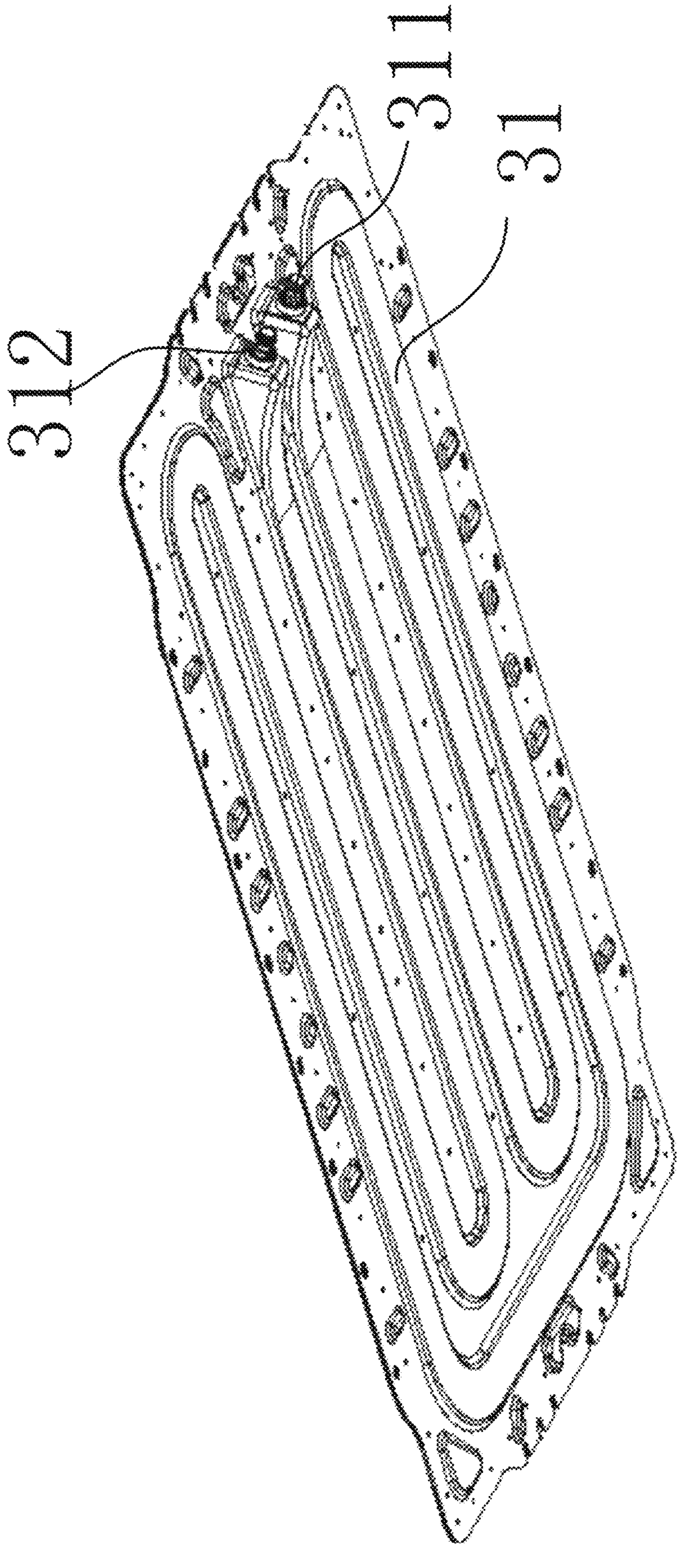
FIG. 6 shows the structural diagram of a cooling bottom plate proposed in Embodiment 3 of the present invention.

Referring to FIG. 6, the cooling bottom plate 5 is provided with a water channel pipe 31 arranged in manner of a flow channel along a surface of the cooling bottom plate; one end of the water channel pipe is provided with a liquid inlet 311; another end is provided with a liquid outlet 312, and an external cooling liquid is connected to the liquid inlet 311, achieving heat dissipation for the battery box 13 supported by an upper end of the cooling bottom plate.

The aircraft does not need to utilize liquid cooling for heat dissipation during flight, but only relies on the structural design of the power battery for heat dissipation. When the aircraft lands for charging, using external liquid cooling for heat dissipation can lead to fast heat dissipation for the battery, thereby enabling higher charging power for charging. In practical implementation, the cooling bottom plate 5 is divided into a water channel plate and a cover plate. The water channel plate and the cover plate are bonded and are sealed with structural adhesive and reinforced with fasteners such as screws or bolts. The water channel plate has the liquid inlet 311 and the liquid outlet 312.

Embodiment 4

Figure 7:
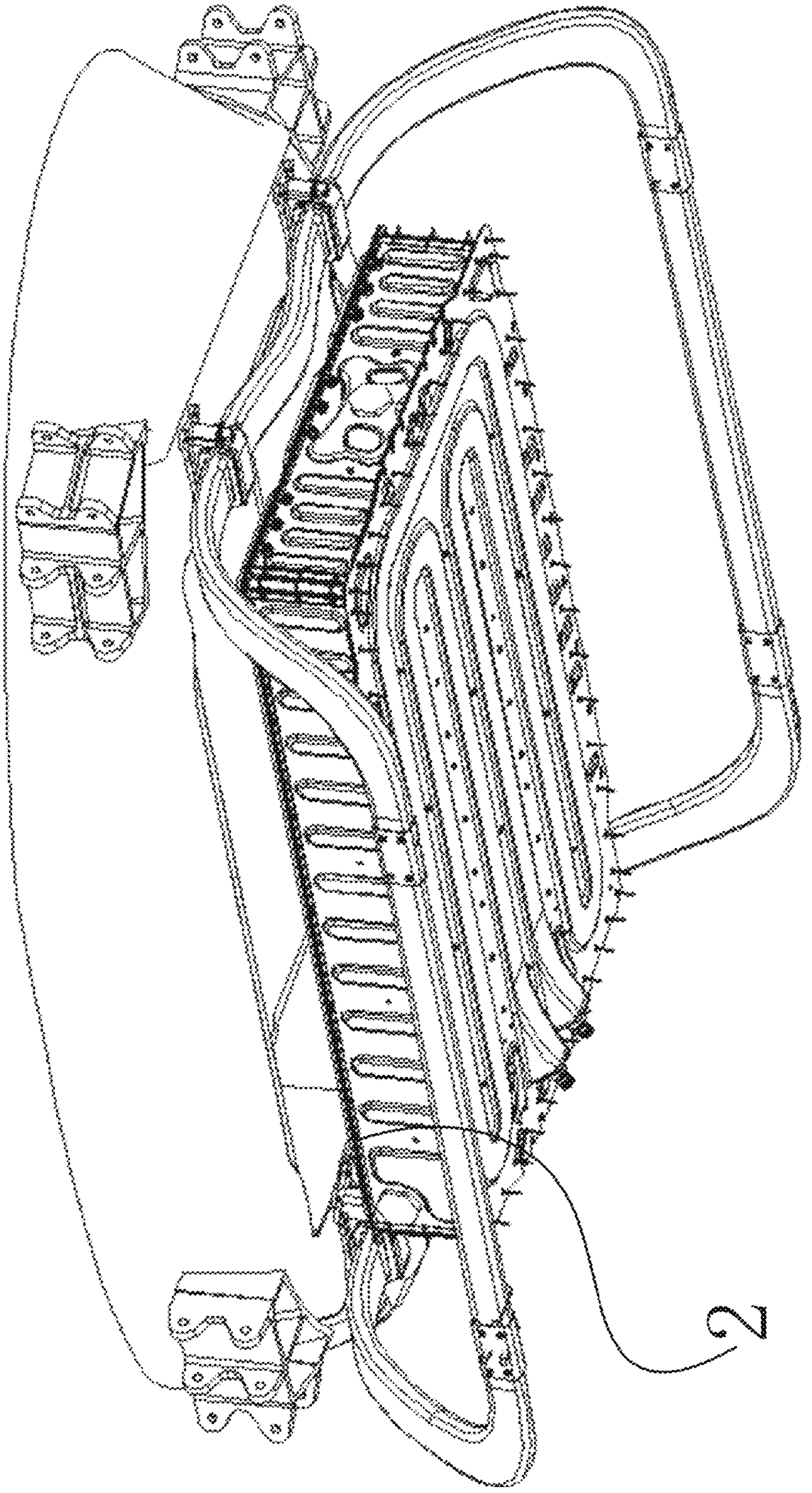
FIG. 7 shows the structural diagram of an aircraft with a power battery proposed in Embodiment 4 of the present invention.

Referring to FIG. 7, the present embodiment also proposes an aircraft, and the aircraft is provided with the aircraft power battery, as shown in FIG. 7. The aircraft power battery is provided at a bottom end of the aircraft. In specific implementation, the power battery is fixed by fastening bolts through a flange at a bottom of its bottom plate or side plate, and may be replaced by a single person with the help of a lift, which is convenient for installation and maintenance. In addition, the upper cover body 2 of the aircraft power battery is in contact with the bottom end of the aircraft, and the cavity design of the upper cover 2 effectively blocks heat from transferring upwards, avoiding the phenomenon of heat accumulation inside the cabin which affecting other components inside the cabin.

Embodiment 5

Figure 8:
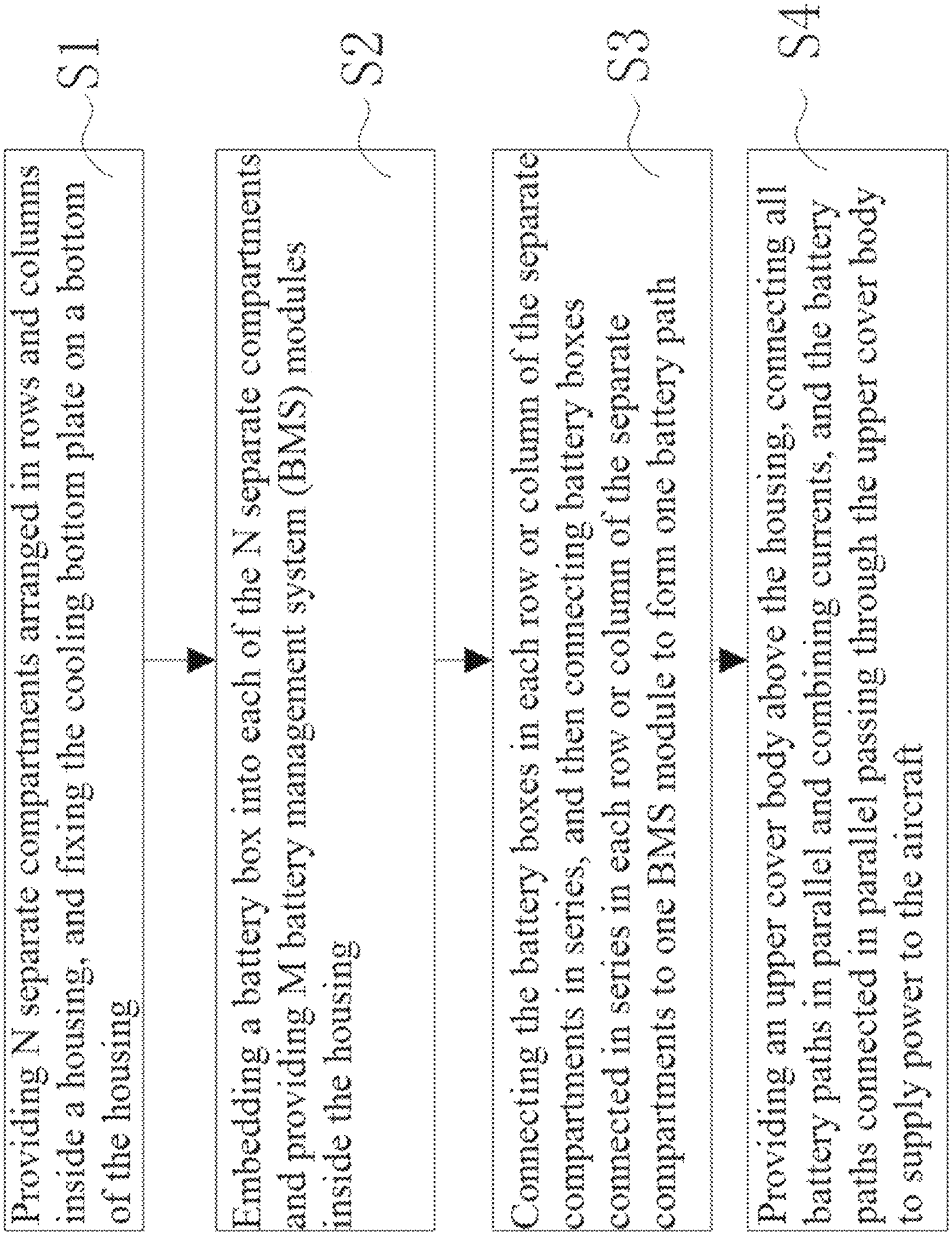
FIG. 8 shows a flowchart of an aircraft power battery integrated power supply method proposed in Embodiment 5 of the present invention.

As shown in FIG. 8, the present embodiment proposes an aircraft power battery integrated power supply method. The flowchart of the method is shown in FIG. 8. The method includes the following steps of:

S1. providing N separate compartments arranged in rows and columns inside a housing, and fixing a cooling bottom plate on a bottom of the housing;

S2. embedding a battery box into each of the N separate compartments and providing M battery management system (BMS) modules inside the housing;

S3. connecting the battery boxes in each row or column of the separate compartments in series, and then connecting battery boxes connected in series in each row or column of the separate compartments to one BMS module to form one battery path;

S4. providing an upper cover body above the housing, connecting all battery paths in parallel and combining currents, and then the battery paths connected in parallel passing through the upper cover body to supply power to the aircraft.

The aircraft power battery integrated power supply method proposed in this embodiment focuses on the design of the power battery structure in the early stage. Separate compartments arranged in rows and columns are provided in the housing, and each separate compartment 11 accommodates one battery box 13. Then, the battery boxes 13 in each row or column (referring to that the rows or columns of the separate compartment arranged are not limited) of separate compartments 11 are connected in series to one BMS module 12. A plurality of battery paths are formed and then connected in parallel, and then supply power to the aircraft. It achieves the integrated arrangement of the position limitation and integration of battery packs and battery management system, avoiding the occurrence of high working current and overheating of connected wire harness caused by scattered layout of each battery pack in the cabin currently, and is conducive to installation and maintenance. In addition, a cooling bottom plate 3 is equipped to ensure heat dissipation performance, ensuring reliability of aircraft power battery integrated power supply.

Obviously, the above embodiments of the present invention are only examples provided to clearly illustrate the present invention, and are not limitations on the embodiments of the present invention. Those of ordinary skill in the art may also make other changes or variations in different forms on the basis of the above description. It is unnecessary and impossible to enumerate all embodiments herein. Any modifications, equivalent substitutions, improvements, etc. made within the spirit and principle of the present invention should be included within the scope of protection of the claims of the present invention.

What is claimed is:

1. An aircraft power battery, wherein the aircraft power battery is provided at a bottom end of an aircraft, and comprises: a housing, an upper cover body, and a cooling bottom plate, wherein N separate compartments arranged in rows and columns are provided inside the housing, and M battery management system (BMS) modules are further provided inside the housing; a battery box is accommodated in each of the N separate compartments, the upper cover body is located above the housing, and the cooling bottom plate is located at a bottom end of the housing; and the battery boxes in each of the rows or each of the columns of the N separate compartments are connected in series and then connected to one of the M BMS modules to form M battery paths, wherein all the M battery paths are connected in parallel and currents of the M battery paths are combined to supply power to the aircraft, wherein N is greater than M, N is an integer, N is greater than or equal to 2, M is the integer and M is greater than or equal to 1; wherein a reinforcing bar is provided between adjacent rows or adjacent columns of the N separate compartments.

2. The aircraft power battery according to claim 1, wherein a battery compartment is formed between each of the rows or each of the columns of the N separate compartments and the reinforcing bar, each battery compartment corresponds to one of the M battery paths, and an explosion-proof valve is provided on each battery compartment.

3. The aircraft power battery according to claim 2, wherein a current combiner box is further provided inside the housing, and all the M battery paths are connected in parallel and then are connected to the current combiner box, the current combiner box is provided with pairs of sockets, and each pair of sockets corresponds to a positive interface and a negative interface respectively, for supplying the power to different aircraft propeller motors.

4. The aircraft power battery according to claim 1, wherein the upper cover body is constituted by two stamped and formed plates enclosed with each other, cavities are formed between the two stamped and formed plates, and a position of each of the cavities corresponds to a position of the battery box in the N separate compartments below the plurality of cavities.

5. The aircraft power battery according to claim 4, wherein the two stamped and formed plates of the upper cover body are made of a composite material, wherein an outer layer of the upper cover body is made of a carbon fiber material, and an inner layer of the upper cover body is made of a glass fiber material.

6. The aircraft power battery according to claim 1, wherein the cooling bottom plate is provided with a water channel pipe arranged in a manner of a flow channel along a surface of the cooling bottom plate, a first end of the water channel pipe is provided with a liquid inlet, and a second end of the water channel pipe is provided with a liquid outlet, and an external cooling liquid is connected to the liquid inlet.

7. An aircraft power battery, wherein the aircraft power battery is provided at a bottom end of an aircraft, and comprises: a housing, an upper cover body, and a cooling bottom plate, wherein N separate compartments arranged in rows and columns are provided inside the housing, and M battery management system (BMS) modules are further provided inside the housing; a battery box is accommodated in each of the N separate compartments, the upper cover body is located above the housing, and the cooling bottom plate is located at a bottom end of the housing; and the battery boxes in each of the rows or each of the columns of the N separate compartments are connected in series and then connected to one of the M BMS modules to form M battery paths, wherein all the M battery paths are connected in parallel and currents of the M battery paths are combined to supply power to the aircraft, wherein N is greater than M, N is an integer, N is greater than or equal to 2, M is the integer and M is greater than or equal to 1; wherein the housing comprises a forward plate, a left plate, a backward plate, and a right plate, the forward plate, the left plate, the backward plate, and the right plate are sequentially combined and enclose to form an accommodating space, the forward plate, the left plate, the backward plate, and the right plate are all made of composite materials, wherein outer layers of the forward plate, the left plate, the backward plate, and the right plate are all made of a carbon fiber material, and inner layers of the forward plate, the left plate, the backward plate, and the right plate are all made of a fiberglass material.

8. The aircraft power battery according to claim 7, wherein a reinforcing bar is provided between adjacent rows or adjacent columns of the N separate compartments.

9. An aircraft power battery, wherein the aircraft power battery is provided at a bottom end of an aircraft, and comprises: a housing, an upper cover body, and a cooling bottom plate, wherein N separate compartments arranged in rows and columns are provided inside the housing, and M battery management system (BMS) modules are further provided inside the housing; a battery box is accommodated in each of the N separate compartments, the upper cover body is located above the housing, and the cooling bottom plate is located at a bottom end of the housing; and the battery boxes in each of the rows or each of the columns of the N separate compartments are connected in series and then connected to one of the M BMS modules to form M battery paths, wherein all the M battery paths are connected in parallel and currents of the M battery paths are combined to supply power to the aircraft, wherein N is greater than M, N is an integer, N is greater than or equal to 2, M is the integer and M is greater than or equal to 1; wherein a battery cell body is provided in the battery box, an independent cover plate is provided on the battery cell body, a foam is provided on a side circumference of the battery cell body, and each of the N separate compartments limits a position of the battery box via the foam.

10. The aircraft power battery according to claim 9, wherein a reinforcing bar is provided between adjacent rows or adjacent columns of the N separate compartments.

11. An aircraft, wherein the aircraft is provided with the aircraft power battery according to claim 1, the aircraft power battery is provided at the bottom end of the aircraft, and the upper cover body of the aircraft power battery is in contact with the bottom end of the aircraft.

12. The aircraft according to claim 11, wherein in the aircraft power battery, the housing comprises a forward plate, a left plate, a backward plate, and a right plate, the forward plate, the left plate, the backward plate, and the right plate are sequentially combined and enclose to form an accommodating space, the forward plate, the left plate, the backward plate, and the right plate are all made of composite materials, wherein outer layers of the forward plate, the left plate, the backward plate, and the right plate are all made of a carbon fiber material, and inner layers of the forward plate, the left plate, the backward plate, and the right plate are all made of a fiberglass material.

13. The aircraft according to claim 11, wherein in the aircraft power battery, a battery cell body is provided in the battery box, an independent cover plate is provided on the battery cell body, a foam is provided on a side circumference of the battery cell body, and each of the N separate compartments limits a position of the battery box via the foam.

14. The aircraft according to claim 11, wherein in the aircraft power battery, a battery compartment is formed between each of the rows or each of the columns of the N separate compartments and the reinforcing bar, each battery compartment corresponds to one of the M battery paths, and an explosion-proof valve is provided on each battery compartment.

15. The aircraft according to claim 14, wherein in the aircraft power battery, a current combiner box is further provided inside the housing, and all the M battery paths are connected in parallel and then are connected to the current combiner box, the current combiner box is provided with pairs of sockets, and each pair of sockets corresponds to a positive interface and a negative interface respectively, for supplying the power to different aircraft propeller motors.

16. The aircraft according to claim 11, wherein in the aircraft power battery, the upper cover body is constituted by two stamped and formed plates enclosed with each other, cavities are formed between the two stamped and formed plates, and a position of each of the cavities corresponds to a position of the battery box in the N separate compartments below the plurality of cavities.

17. The aircraft according to claim 16, wherein in the aircraft power battery, the two stamped and formed plates of the upper cover body are made of a composite material, wherein an outer layer of the upper cover body is made of a carbon fiber material, and an inner layer of the upper cover body is made of a glass fiber material.

* * * * *